(12) United States Patent
Thrane

(10) Patent No.: US 6,732,150 B1
(45) Date of Patent: May 4, 2004

(54) APPARATUS, AND ASSOCIATED METHOD, FOR PROVIDING A CLIENT WITH OUT-OF-BAND MESSAGES

(75) Inventor: Léon Thrane, Woburn, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/333,640

(22) Filed: Jun. 15, 1999

(51) Int. Cl.[7] .............................................. G06F 15/16
(52) U.S. Cl. ....................... 709/206; 709/203; 709/219
(58) Field of Search ................................ 709/206, 203, 709/238, 218, 217, 219, 227, 229, 249; 370/389, 401

(56) References Cited

U.S. PATENT DOCUMENTS

| | | | | |
|---|---|---|---|---|
| 5,305,195 A | * | 4/1994 | Murphy .......................... 705/1 |
| 5,701,427 A | * | 12/1997 | Lathrop ....................... 709/237 |
| 5,848,396 A | | 12/1998 | Gerace ........................ 705/10 |
| 5,854,897 A | * | 12/1998 | Radziewicz et al. ........ 709/224 |
| 5,961,603 A | * | 10/1999 | Kunkel et al. .............. 709/229 |
| 5,996,007 A | * | 11/1999 | Klug et al. ................. 709/218 |
| 6,178,446 B1 | * | 1/2001 | Gerszberg et al. .......... 709/217 |
| 6,237,022 B1 | * | 5/2001 | Bruck et al. ................ 709/201 |
| 6,237,039 B1 | * | 5/2001 | Perlman ..................... 709/237 |
| 6,317,761 B1 | * | 11/2001 | Landsman et al. ............ 707/13 |
| 6,317,789 B1 | * | 11/2001 | Rakavy et al. .............. 709/224 |
| 6,341,305 B2 | * | 1/2002 | Wolfe ........................ 709/203 |
| 6,363,419 B1 | * | 3/2002 | Martin, Jr. et al. ......... 709/219 |

FOREIGN PATENT DOCUMENTS

| | | |
|---|---|---|
| WO | WO 98/47090 | 10/1998 |
| WO | WO 99/09486 | 2/1999 |

OTHER PUBLICATIONS

"UMTS: A Middleware Architecture and Mobile API Approach," IEEE Communications Society, vol. 5, 1, 1998, pp. 32–38, XP000751833.

"WAP—The Wireless Application Protocol," Ericsson Review, SE, Ericsson, Stockholm, No. 4, 199 153, XP000792053.

\* cited by examiner

*Primary Examiner*—Frantz B. Jean

(57) ABSTRACT

Apparatus, and an associated method, provides OOB (out-of-band) messages to a mobile client. OOB messages formed of alerts, notifications, push messages, advertising, as well as many other types of messages, are able to be provided to the client. The OOB messages are provided to the client by a gateway, such as a WAP gateway operable in a communication system pursuant to the WAP standard.

14 Claims, 4 Drawing Sheets

APPARATUS, AND ASSOCIATED METHOD, FOR PROVIDING A CLIENT WITH OUT-OF-BAND MESSAGES

FIELD OF THE INVENTION

The present invention relates generally to communications between a client and a content source in a communication system which includes a radio part, such as a radio part employing the WAP (Wireless Application Protocol) standard and more particularly, to an apparatus and an associated method for providing OOB (Out-of-Band) messages to the client.

BACKGROUND OF THE INVENTION

Advancements in communication technologies have permitted the introduction and popularization of new types of communication systems. As a result of such advancements, e.g., significant increases in the rates of data transmission have been permitted and new types of communication services have also been made possible. Advancements in digital communication techniques are amongst the advancements in communication technologies which have permitted the introduction of new types of communication systems.

A radio communication system is exemplary of a type of communication system which has benefited from advancements in communication technologies and the use of digital communication techniques.

In a radio communication system, at least a portion of a communication path formed during communications therein includes a radio-link. Improvements in communication mobility are provided through use of a radio communication system as communication channels defined upon the radio-link in such a system are formed of radio channels and do not require wireline connections for their formation. The portion of the communication system which includes the radio-link is sometimes referred to as the radio part of the communication system.

Digital communication techniques have- been utilized in radio communication systems, thereby permitting improvement of communication capacities in such systems as well as permitting the implementation of new communication services. For instance, packet radio services are possible through the use of digital communication techniques. Such packet radio services have been proposed for several radio communication systems to permit the communication of packet data. The communication of packet data, in general, involves the formatting of groups of digital bits into packets to form packets of data. The packets of data are communicated, either individually, or in groups, at discrete intervals. Once received, the packets of data are concatenated together to recreate the informational content of the digital bit of which the packets are formed.

Examples of packet radio services which have been proposed, or already implemented, include multi-media services, messaging services, distribution services, dispatching services, and retrieval services. Retrieval of content provided pursuant to the World Wide Web (www) of the Internet is exemplary of a retrieval service.

Revenues which support the content providers of content retrievable pursuant to the www are typically generated through subscription payment, service charges, click fees, and advertising. In a subscription payment, a user pays a cyclic, for example, monthly, quarterly, yearly, etc., fee in order to access the services and contents that are retrieved. Service charge is referred to charges paid by a user to receive performance of a service. Click fees refer to charges accruing to a user based upon simple metrics, such as links followed, duration of contact, or other measurable use of a content source.

And, advertising refers to third party payments to a content provider for the display of promotional messages, typically including the links which permit a user to follow the links to obtain additional content regarding the advertised material.

Generally, existing retrieval services over the www are effectuated by a user of a conventional computer, such as a personal computer. Content is displayed in the form of screens displayable upon a conventional computer screen, or the like. Both desired informational content as well as advertising regularly forms a single screen. Therefore, when a user uses the desired content, the advertising message is also displayed.

However, in a radio communication system, the client, that is, the mobile station or other device utilized by a user, shall not necessarily, and perhaps shall likely not, have a display element of dimensions permitting the display of a screen containing both the informational content and the advertising. Network systems employing the WAP (Wireless Application Protocol) standard utilizing OOB (Out-of-Band) messaging have been proposed. When using OOB messaging, advertising is displayed on the display element of the mobile station, sometimes hereinafter referred to as a "client," and thereafter display the informational content on the display element of the mobile station.

Push messages, that is, a synchronous notifications, as well as alerts, and notification are also exemplary OOB messages. While the aforementioned WAP standard is permitting of the transport of OOB messages, such as push messages, the existing WAP standard fails to define a push mechanism.

Difficulties are, however, associated with retrieval services, in which content is to be provided to a portable mobile station. That is to say, in a conventional system, a content provider provides both the content as well as the advertising. Special hardware and software for the computer server from which the content and advertising originates is required. The need for such special hardware and software at the computer server used by the content provider increases its complexity.

It would be advantageous, therefore, if a manner could be devised which could better provide OOB messages to the client pursuant to retrieval services.

It would be further advantageous if a manner could be devised which could better provide a synchronous communications, such as push messages, alerts, and notifications.

It is in light of this background information related to the communication of OOB messages that the significant improvements of the present invention have evolved.

SUMMARY OF THE INVENTION

The present invention, accordingly, advantageously provides an apparatus and an associated method for providing OOB (Out-of-Band) messages to a client in a communication system which includes a radio part.

The OOB messages are provided to the client by a radio part gateway which forms at least part of the communication path upon which communications with the client are effectuated. In a communication system which employs the WAP (Wireless Application Protocol) standard, the gateway may be a WAP gateway.

In one aspect of the present invention, a synchronous, OOB messages are provided to the client. Alerts, notifications, and push messages are exemplary of a synchronous messages. PIM notifications, paging services, and location-based notifications all are exemplary of services possible pursuant to operation of an embodiment of the present invention.

In another aspect of the present invention, OOB messages are provided by the gateway to the client responsive to requests made by the client for content from a content provider. When an initial request is made for initial content, the request is communicated by way of the gateway to the content source. When the content is returned by the content source, the content is provided to a filter which at least selectably parses the content to detect links in the content selectable by a user, when displayed at the client, or additional content. The links identify URLs of locations at which the additional content is sourced. The filter flags URLs within the content so that the gateway is aware that OOB messages can be provided when selection is made at the client to request such additional content. The original, initial content is then provided to the client together with URL modifications to permit flagging of possible OOB message URLs. When selection is made at the client to request such additional content, the request is provided to a gateway.

When detected at the gateway, an OOB message, such as an advertising display, is returned to the client and, the gateway generates a substitute request which is forwarded to the content source at which the additional content is sourced. The OOB message is thereby displayed at the client during the pendency of the substitute request for the additional content generated by the gateway.

In one embodiment, the OOB message is displayed at the client for at least a minimum, selected time period, subsequent to which the client generates a new request for the additional content, which, if necessary, is stored at the gateway subsequent to retrieval from the content source of the additional content. Filtering of the additional content further permits additional OOB messages to be provided to the client in analogous manners during pendency of subsequent requests. In an exemplary implementation, the communication system can include a radio part which is operable pursuant to the WAP (Wireless Application Protocol) standard. The radio part interfaces with a WAP gateway through which all communications with the client are routed. However, a radio part is not necessary for routing client communications. Other communication paths can include for example POTS and PSTN and other known mediums and protocols.

An embodiment of the present invention forms additional apparatus for a gateway through which an owner, or operator, of the gateway is provided with the capability to send OOB messages to a client which utilizes the gateway for communications. OOB messages are displayed, e.g., during an interval between a request originating from the client and a reply returning from the content source, typically an origin server. The OOB messages can contain any type of content and can be used for any application in which OOB messaging is appropriate. An OOB message forming an advertising display is an exemplary message which is communicated to the client during operation of an embodiment of the present invention. In alternate implementations, asynchronous messages, such as push messages, are provided to the client.

In an embodiment of the present invention, advantage is made of the communication path which extends between the client and content source of the communication system which may include a WAP, or other wireless-protocol, part. All communications with the client in such a communication system typically must pass through the gateway. Wireless communication system implementation is predicated on the traditional, narrow bandwidth of wireless connections, in contrast to conventional wireline communication paths. Because of the narrow band width, the rate of data transfer on a wireless-link is relatively slow. The WAP standard requires that all content communicated upon the wireless-link be encoded prior to its transmission to the client. And, when a request is originated at a client and communicated upon a wireless-link, request headers of the request must be decoded prior to forwarding of the request by the gateway to the content source. In other words, the WAP, or other gateway, forms a central point of contact between client and content source during operation of the system. Advantage is taken of the fact that the gateway is the central point of contact during operation of the various embodiments of the present invention.

In these and other aspects, therefore, an apparatus, and an associated method, is provided for a gateway of a communication system in which data is communicated between a client and at least a first content source upon a communication path. The gateway provides an Out-of-Band message to the client. An Out-of-Band message source is coupled to receive at least one Out-of-Band message, the at least one Out-of-Band message selectably to be communicated to the client. A selector is coupled to the Out-of-Band message source. The selector selects whether to communicate to the client a selected Out-of-Band message to which the Out-of-Band message source is coupled to receive.

A more complete description of the present invention and the scope thereof can be obtained from the accompanying drawings which are briefly summarized below, the following detailed description of the presently-preferred embodiments of the invention, and the appended claims.

DETAILED DESCRIPTION

Figure 1:
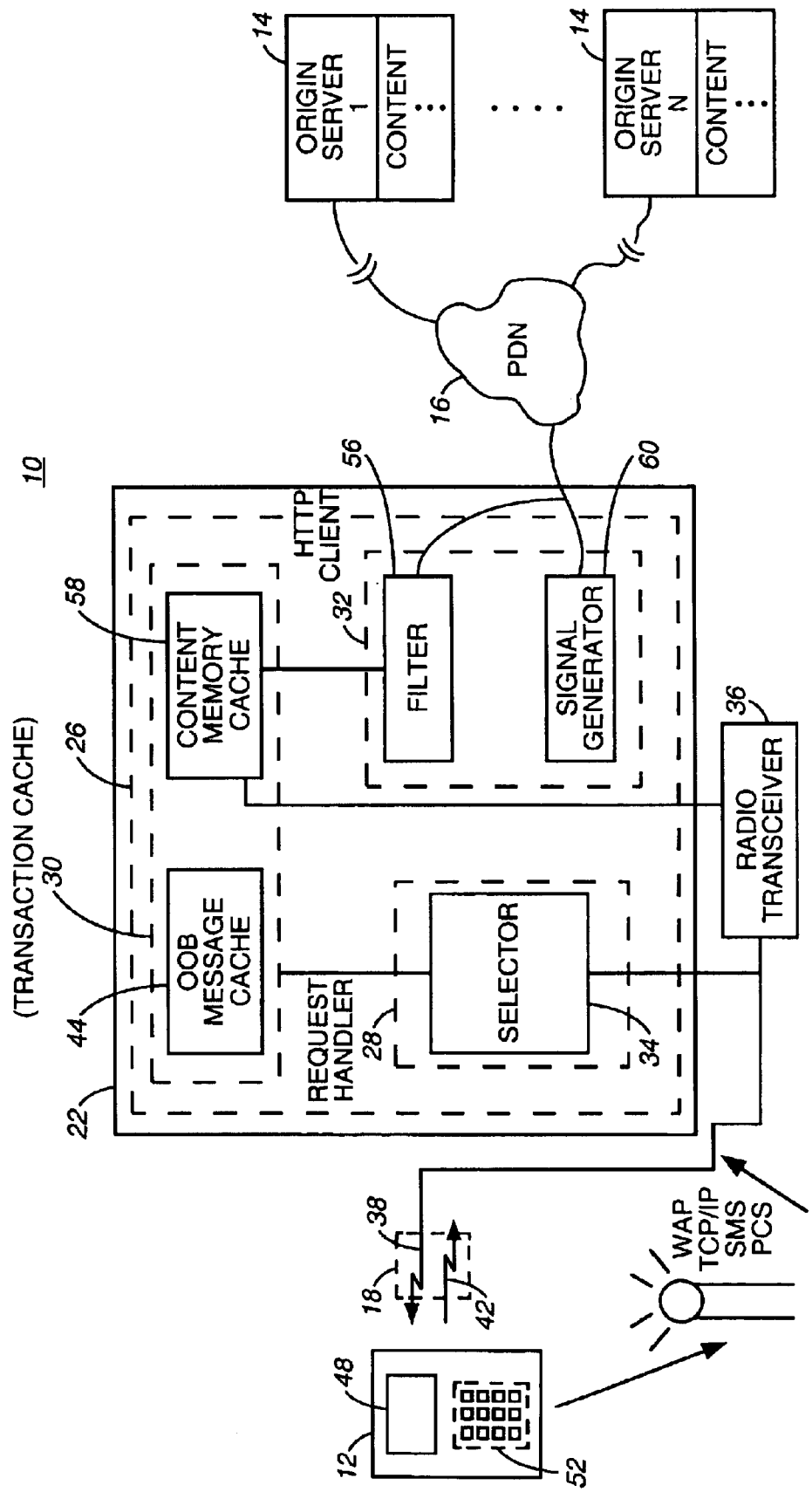
FIG. 1 illustrates a functional block diagram of a communication system in which an embodiment of the present invention is operable.

Referring first to FIG. 1, a communication system, shown generally at 10, provides for the communication of packet data between a client 12 and a selected origin server 14. The communication system includes a wireline portion, including a packet data network 16 to which the origin servers 14 are connected. In the embodiment shown in FIG. 1, the communication system includes a radio part including a radio-link 18 by which to effectuate radio communications with the client. A WAP (Wireless Application Protocol) gateway 22 also forms a portion of the communication system. All communications between the client 12 and an origin server 14 pass through the gateway 22. While, in the exemplary implementation, the radio part of the radio communication system is constructed to be operable pursuant to a WAP standard, in other implementations the communication system is operable pursuant to other standards.

While the embodiment discussed uses a wireless link to a mobile station, neither a wireless link nor a mobile station are necessary to realize the advantages of the present disclosure. For example, other clients can be substituted for the mobile station described in FIG. 1. Such clients can include, for example, a computer. For another example, other communication links can be used in place of the radio part described. Such communication channels can include, for example, POTS PSTN, ISDN, ADSL, XDSL, PLMN, WLAN, or other appropriate communication schemes can be used.

In addition to apparatus required for conventional operation of the WAP gateway to perform encoding and decoding operations of content to be provided to the client 12 and signals received by the client, the gateway is operable pursuant to an embodiment of the present invention to provide OOB (Out-of-Band) messages to the client. The apparatus, shown at 26, includes a request handler 28, a transaction cache 30, and an HTTP client 32. Functions performed by the handler, transaction cache, and HTTP client are shown in block form in the Figure. Such functions are exemplary, and operation of an embodiment of the present invention can alternately be implemented in other manners. And, while in the exemplary implementation, the WAP gateway 22 and apparatus 26 thereof are shown to be physically separated from the origin servers 14, such devices can also be co-located. However, the functionality of such separate devices remain distinguishable.

The request handler 28 is here shown to include a selector 34. The selector is here shown to be coupled to a radio transceiver 36 capable of transceiving communication signals with the client 12 on the radio-link 18. The radio-link 18 is shown to include a forward link 38 and a reverse link 42. The selector is further coupled to an OOB message cache 44. The selector is operable to select whether to provide an OOB message stored at the cache 44 to the client 12. The OOB messages are permanently stored at the message cache, or are provided thereto from an external location, here indicated by way of the line 46.

When selection is made by the selector 34 to provide the client with an OOB message, the OOB message is communicated to the client on the forward link 38 by the radio transceiver 36 which, for instance, is formed of a radio base station. The link from the radio transceiver to the gateway transports digital data. The digital data can be either streaming or packetized with protocols such as TCP/IP, SMS, PCS, WAP, or other suitable protocol. The OOB message selected to be communicated to the client may, for instance, be an asynchronous message, such as a push message, and alert, or other notification. Once provided to the client, the OOB message is displayed upon a display element 48 of the client. In one implementation, the asynchronous OOB message remains displayed at the display element of the client until a user actuates an appropriate user actuation key 52 of the client to remove the OOB message from the display.

In a further embodiment of the present invention, a user of the client is able to request content stored at an origin server 14 to be retrieved therefrom and displayed at the display element 48 of the client. When the content is requested, a request is generated on the reverse link channel 42 and detected at the gateway. Retrieval services pursuant to the World Wide Web/Intranet are exemplary of this operation when the PDN 16 is representative of the Internet backbone. When a request is an initial request for content, the request is forwarded to the appropriate origin server. The origin server and the contents therein are identified, for instance, by a URL. Responsive to the request, the content is retrieved from the origin server and returned to the HTTP client 28 of the gateway 22.

The content is provided to a filter 56 which is selectably operable to pass the retrieved content to identify hyperlinks contained in the retrieved content which form links to other content. When the hyperlinks are detected, the filter flags the URLs within the content. Thereby the gateway is able to provide OOB messages when the client subsequently requests the additional content identified by the hyperlinks. The filter generates an output which is formed of the original content, together with URL modifications needed to flag possible OOB message URLs. Then, the content is forwarded to the client.

When the user of the client requests additional content, an additional request is generated on the reverse link 42 for such additional content. When the additional request is detected at the gateway, the URL identified in the additional request contains a flagged URL. The selector of the gateway is able to select an OOB message from the message cache 44 to be returned to the client to be displayed at the display element 48. And a substitute request is generated by the substitute request generator to be communicated to the appropriate origin server to retrieve the additional content. During pendency of the retrieval of the actual content, the OOB message is displayed at the display element of the client. If, conversely, a selection is made not to send any OOB messages to the client, the request process is started over again, such process described previously.

When the substitute request is generated, a new request ID unique to this request is created and the OOB message is immediately provided to the client as a reply to the additional request. The OOB message includes an anchor or action that requests a URL pointing to an entry in the transaction cache of the gateway which is identified by the unique request identification.

As the OOB message is provided on the forward link 38 to the client, the substitute request is forwarded to the appropriate origin server 14 to retrieve the contents stored thereat. When the additional content is returned, the additional content.is filtered by the filter 56 of the HTTP client to flag additional, relevant URLs for subsequent OOB messaging. The output generated by the filter is stored, if necessary, at a content memory cache 58 of the transaction cache.

In the exemplary implementation, the OOB message displayed at the display element 48 during performance of such retrieval service is displayed thereat for at least a selected time period. When such time period times out, a request is automatically generated by the client for the actual content. The request is communicated over the reverse link 42 of the radio-link 18. And, responsive thereto, the content stored at the memory cache is retrieved and provided to the client. Thereby, the initial content and the additional content is displayed at the display element, interspersed with an OOB message. Subsequent fetches repeat the same process.

The disclosed innovations may be implemented without modifying the URL with a flag. By a lookup table method within the gateway, the same results may be achieved without modifying the URLs received from the content source other similar methods can be used.

A manner is thereby provided by which to provide OOB messages to the client whenever the client connects to the Internet. Applications at the respective origin servers need not be aware of the operation of the apparatus 26 of the gateway for either the application or the OOB mechanism to function. A number of services are thereby able to be provided seamlessly and independently of the provider of the content stored at the origin server or the origin server.

For instance, advertising and promotional messages form the OOB messages stored at the message cache 44. Such advertising and promotional messages are independent decks that contain any legal WAP content, such as WML, WML script, etc. Complex advertising messages, such as images, animations, and other multi-media, can thereby be transferred to the client as an OOB message.

As the content of the OOB message is controlled by the owner or operator of the WAP gateway 22, assurances can be made as to how often, and with what duration, the OOB message shall be displayed at the display element 48 of the client. By forming the advertising messages to be separate WML decks, problems associated with bloating of the content decks is avoided. Such is particularly important in WAP where devices typically have limits on their permitted deck sizes. Also, a developer and content provider need not exert effort on incorporating revenue-generating messages into their application and content as such efforts are performed by the operator of the WAP gateway.

A number of different strategies for providing advertising and promotional messages are permitted. For instance, autonomous control is permitted. In autonomous control, the WAP gateway operator controls, signs, and regulates autonomously all advertising and promotional messages. That is to say, the WAP gateway operator decides what advertisers are permitted, and how frequently messages are permitted to be shown. Revenues generated by such advertising accrues to the WAP gateway operator. In this scheme, the WAP gateway operator need not differentiate the target origin server of the client in selecting which message to promote. The WAP gateway operator is, however, permitted to make such selections. For instance, sponsors of some advertising messages may not want their advertising message associated with certain content.

Another strategy is a content selective strategy. Here, the WAP gateway operator is able to target individual WAP service in content providers to offer such providers the advertising and promotional messages for an appropriate fee. The system would then only display advertising and messages specific to a particular origin server pursuant to agreement between the WAP gateway operator and the operator of the appropriate origin server.

Also, a user profile strategy is possible. The WAP gateway owner is able to create user profiles of users of the client in order to tailor messages to a specific target group. Such strategy would permit the WAP gateway operator to provide sponsors the additional guarantee of reaching a desired target market. Such a strategy would also have the benefit of not inconveniencing users of the clients with irrelevant messages. Combinations of the strategies are also possible.

Through operation of an embodiment of the present invention, a push mechanism is provided for communicating asynchronous messages to the client. In the existing WAP standard, a push mechanism is not yet implemented. Although the push mechanism envisioned for the WAP standard is a true asynchronous push because there is no push mechanism set forth in the WAP standard yet, the functionality provided by the apparatus 26 encompasses a significant number of applications utilizing the push mechanism.

Analogously, alerts and notifications, also storable at the message cache 44 can be provided to the client. Alerts and notifications include, for instance, PIM notifications in which appointment messages can be sent to the client during a time leading up to a scheduled meeting, thereby providing a constant reminder of an upcoming event. Also, pages and messages from other users can also be transmitted to the client utilizing an embodiment of the present invention. And location-based notifications to provide location-based information to a user of the client, such as road conditions, can also be provided to the client. In addition, OOB messages forming news bulletins, humorous, or motivational messages can also be provided to the client during pendency of a request for content.

Figure 2:
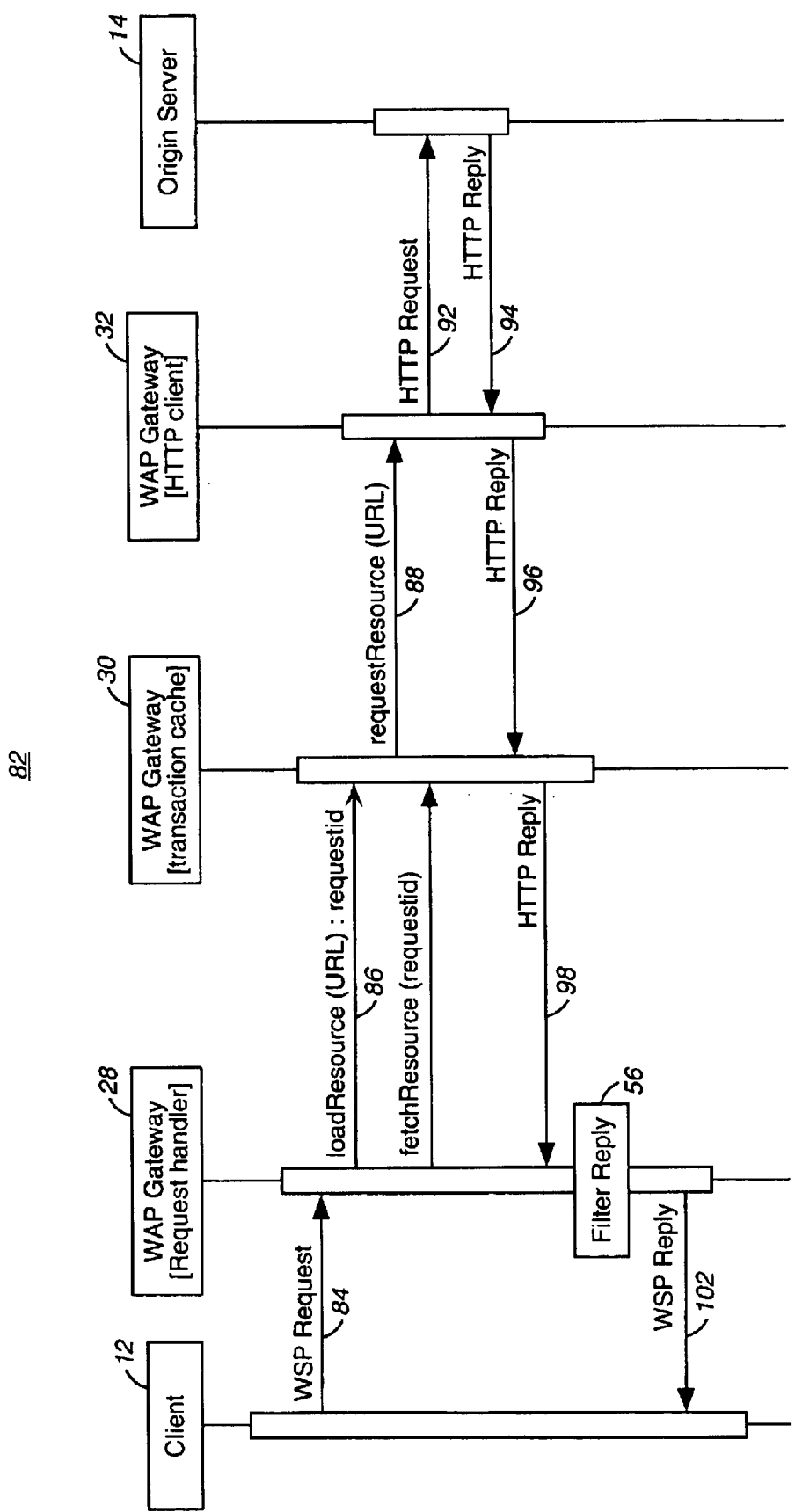
FIG. 2 illustrates a sequence diagram listing the sequence of signal generation during operation of the communication system shown in FIG. 1.

FIG. 2 illustrates a sequence diagram, shown generally at 82, in which signaling between the client 12, WAP gateway 22, and origin server is shown. Here, the WAP gateway is shown to include the request handler 28, the transaction cache 30, and HTTP client 32. The sequence diagram 82 illustrates the generation of a generic request by the client without the return by the WAP gateway of an OOB message.

First, and as indicated by the segment 84, a WSP request is generated by the client and delivered to the request handler 28. Responsive thereto, a load resource (URL) call and request ID is caused to be generated, indicated by the segment 86. Thereafter, a request resource signal including a URL is generated, indicated by the segment 88. Such request is provided to the HTTP client 32 which, in turn generates an HTTP request indicated by the segment 92 and provided to the origin server 14. The content is returned as part of an HTTP reply, indicated by the line segment 94.

The HTTP reply is passed by the client 32 to the transaction cache 30 indicated by the segment 96 and the transaction cache forwards the HTTP reply to the request handler 28 here indicated by the segment 98. Filtering is selectably performed at the filter 56, and the content, here in the form of a WSP reply, indicated by the segment 102 is provided to the client.

Figure 3:
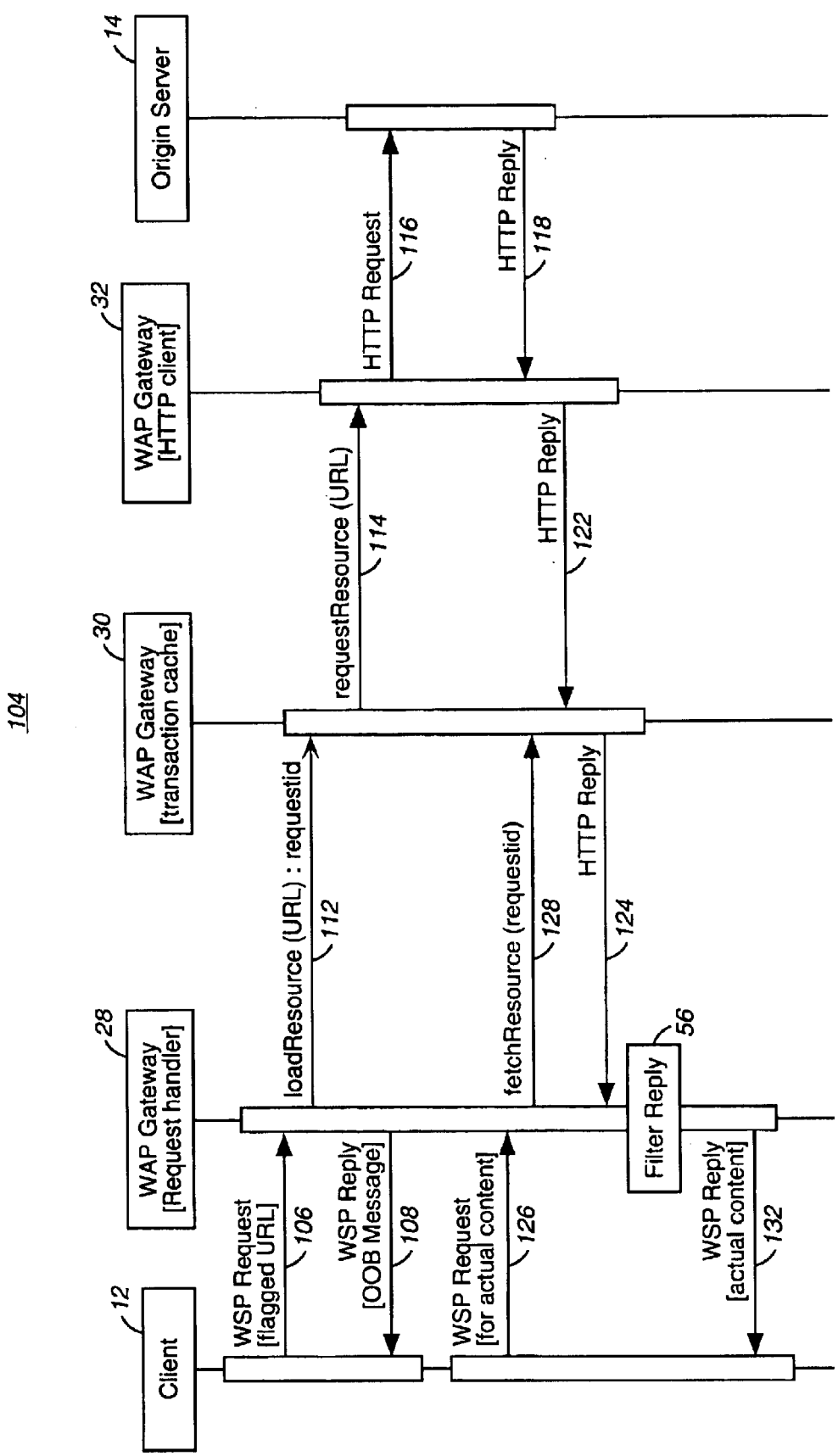
FIG. 3 illustrates a sequence diagram, similar to that shown in FIG. 2, also listing the sequence of signal generation during operation of the communication system shown in FIG. 1.

FIG. 3 illustrates a sequence diagram, shown generally at 104, here representing the sequencing of signals during operation of an embodiment of the present invention in which an OOB message is provided to the client. The OOB message is provided to the client responsive to an additional request by the client for additional content.

First, a WSP request, indicated by the segment 106, including a flagged URL is generated by the client and provided to the request handler 28. The request handler causes a WSP reply formed of the OOB message to be provided to the client, indicated by the segment 108. And, the request handler causes generation of a load resource (URL): request ID signal indicated by the segment 112. Such signal is provided to the transaction cache 30 which generates a request resource (URL) signal, indicated by the segment 114 to the HTTP client 32. The HTTP client generates, in response thereto, an HTTP request here indicated by the segment 116 which is provided to the origin server 14. The origin server generates an HTTP reply, indicated by the segment 118 to the HTTP client which passes the reply, indicated by the segment 122, to the transaction cache 30 which, in turn, parses the reply, indicated by the segment 124, to the requesting handler.

During the request and reply for the content from the origin server, the client generates a WSP request for actual content, indicated by the line 126 which is provided to the request handler. Responsive thereto, the request handler generates a fetch resource (request ID) signal indicated by the segment 128 which is provided to the transaction cache. In the sequencing shown in the Figure, display of the OOB message at the client is completed prior to the availability of the requested content. As shown, the signals represented by the segments 126 and 128 are generated prior to return of the requested content, indicated by the segments 118 and 122. When the content is provided to the request handler 28, the content is selectably parsed by the filter 56. Thereafter, the actual content is provided to the client as a WSP reply indicated by the segment 132.

Figure 4:
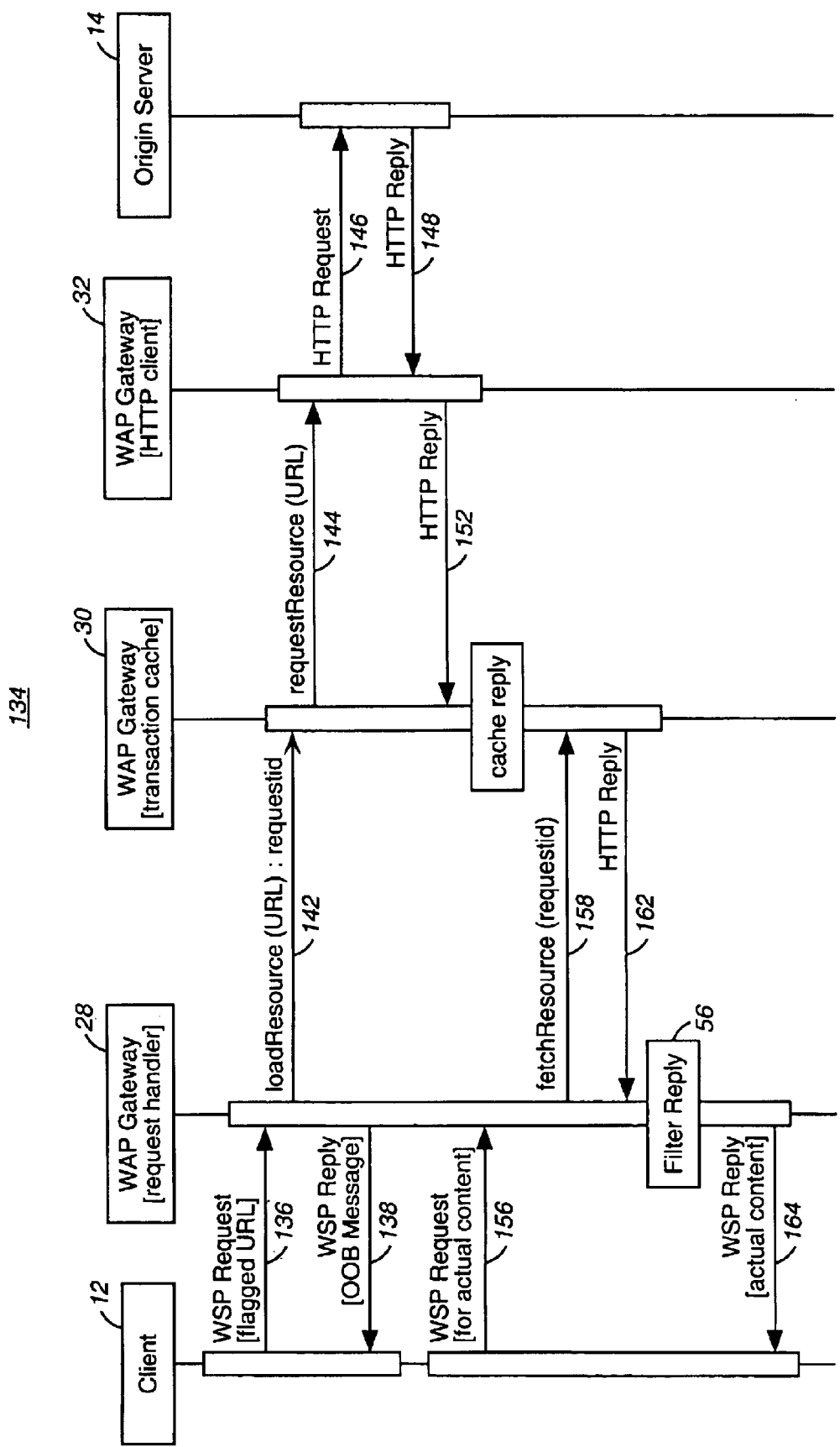
FIG. 4 illustrates a sequence diagram, similar to those shown in FIGS. 2–3, also listing the sequence of signal generation during operation of the communication system shown in FIG. 1.

FIG. 4 illustrates a sequence diagram, shown generally at 134, here also representing the sequencing of signals during operation of an embodiment of the present invention in which an OOB message is provided to the client. In contrast to the sequence diagram shown in FIG. 3, the sequence diagram represents a situation in which delivery of the requested content is provided to the WAP gateway prior to completion of an OOB message at the client. Again, however, the OOB message is provided to the client responsive to an additional request by the client for additional content.

First, and as indicated by the segment 136, a WSP request, including a flagged URL, is generated by the client and provided to the request handler 28. The request handler returns a WSP reply formed of an OOB message to the client indicated by the segment 138. And, the request handler causes generation of a load resource (URL): request ID signal, indicated by the segment 142. Such signal is provided to the transaction cache 30 which generates a request resource (URL) signal indicated by the segment 144, to the HTTP client 32. The HTTP client generates, in response thereto, an HTTP request, here indicated by the segment 146, which is provided to the origin server 14. The origin server generates an HTTP reply, indicated by the segment 148, to the HTTP client. The reply includes the content requested by the client. The HTTP client 32, in turn, parses the reply, indicated by the segment 152, to the transaction cache, here to be stored at the content memory cache thereof.

When the display period of the OOB message is completed, the client generates a WSP request, indicated by the segment 156, for delivery thereto of the actual content. The request is provided to the request handler 28 which, in turn, generates a fetch resource (request ID) signal indicated by the segment 158. The content, already stored at the content memory cache is retrieved therefrom, and returned, in the form of an HTTP reply, indicated by the segment 162, to the request handler. The content is selectably parsed by the filter 56, and the actual content is thereafter provided to the client 12 in the form of a WSP reply, indicated by the segment 164.

Thereby, through operation of various embodiments of the present invention, an OOB message is provided to a mobile client. The OOB message can take almost any form, such as an alert, notification, a push message, an advertising message, or the like. A WAP compliant manner is provided by which to display such messages without the need of special hardware or software at either the client or the origin server. Seamless operation with the use of existing client devices and content providers-origin servers is possible. Also, the size required of the existing content is not increased. Therefore, operation of an embodiment of the present invention does not cause working content to fail when loaded by the client. Content providers and service developers are able to create their content and services without being required to be aware of the operation of an embodiment of the present invention.

The previous descriptions are of preferred examples for implementing the invention, and the scope of the invention should not necessarily be limited by this description. For example, the disclosed embodiments describe flagging the URLs prior to sending them to a mobile station. However, the gateway can be used to track URLs sent to a mobile station without the need to modify URLs.

I claim:

1. An improvement of apparatus for a communication-system gateway for providing an out-of-band message to a wireless client device, said apparatus comprising:

an out-of-band message source coupled to receive at least one out-of-band message, the at least one out-of-band message selectably to be communicated to the wireless client device;

a selector coupled to said out-of-band message source for selecting whether to communicate to the wireless client device the at least one out-of-band message received by the out-of-band message source;

a filter coupled to receive content as communicated to said client by a content source in response to a client-generated request for content, said filter capable of parsing said received content to identify whether said content contains a link, subsequently selectable by the wireless client device, to request retrieval of subsequent content;

a substitute request generator coupled to the selector for generating a substitute request for said subsequent content in response to a further client-generated request for the subsequent content associated with the link, the request communicated upon a communication path to the gateway;

wherein said subsequent content is communicated to the wireless client device subsequent to providing the at least one out-of-band message in response to the further client-generated request for the subsequent content.

2. The apparatus of claim 1 wherein said selector selects communication of said at least one out-of-band message to be communicated to said wireless client device responsive to detection of said client-generated request during pendency of said substitute request for the subsequent content.

3. The apparatus of claim 2 wherein said out-of-band message source comprises an out-of-band memory cache for storing said at least one out-of-band message, wherein selection of said out-of-band message stored at the out-of-band memory cache responsive to detection of said client-generated request further causes an anchor pointing to a selected memory location of said out-of-band memory cache.

4. The apparatus of claim 4 further comprising a subsequent content memory cache coupled to receive said subsequent content provided responsive to generation of the substitute request, said subsequent content memory cache for storing said subsequent content therein.

5. The apparatus of claim 4 wherein said subsequent content, stored at said subsequent content memory cache, is provided to said wireless client device subsequent to delivery thereto of said out-of-band message.

6. The apparatus of claim 5 wherein said client is further operable to generate an actual-content request subsequent to delivery thereto of said out-of-band message, said subsequent content stored at said subsequent content memory cache provided to said wireless client device responsive to said actual-content request.

7. The apparatus of claim 1 wherein said wireless client device comprises a user interface for displaying the out-of-band message and wherein said selector further selects a time period during which the out-of-band message is displayed at the user interface.

8. The apparatus of claim 7 wherein said user interface of said wireless client device further comprises a user input actuator actuable by a user of said client, wherein the time period during which said selector selects the out-of-band message to be displayed comprises an unlimited duration, and wherein actuation of the user input actuator terminates display of the out-of-band message at the user interface.

9. The apparatus of claim 1 wherein said out-of-band message source comprises an out-of-band memory cache in which the at least one out-of-band message is stored, the out-of-band message accessed responsive to selection by said selector of the out-of-band message to be communicated to said wireless client device.

10. A method for providing an out-of-band message to a wireless client device operable in a communication system in which data is communicated between the wireless client device and at least one content source said method comprising:

storing at least one out-of-band message at a communication-system gateway;

receiving an initial request generated by the wireless client device to retrieve first content stored at the at least one content source;

providing the first content to the gateway;

parsing the first content to identify whether the first content contains a link subsequently selectable by the wireless client device to request retrieval of a subsequent content;

providing the first content to the wireless client device;

receiving a request generated by the wireless client device for the subsequent content identified by the link;

selectably providing to the wireless client device the at least one out-of-band message stored during said operation of storing;

generating, at the gateway, a substitute request for the subsequent content; and storing the subsequent content at the gateway provided thereto responsive to generation of the substitute request.

11. The method of claim 10, further comprising the steps of, subsequent to said step of storing the subsequent content:

retrieving the subsequent content stored at the communication-system gateway; and providing the subsequent content to the wireless client device.

12. The method of claim 11 wherein said step of providing the subsequent content to the wireless client device occurs only subsequent to a selected time period after the out-of-band message is provided to the wireless client device.

13. The method of claim 10 wherein the wireless client device comprises a user interface, the user interface including a display and a user input actuator actuable by a user, said method further comprising:

displaying the out-of-band message at the display;

actuating the user input actuator; and removing the out-of-band message displayed at the display responsive to actuation of the user input actuator.

14. The method of claim 10 wherein the wireless client device comprises a user interface and said method further comprises the step of displaying the out-of-band message at the user interface for at least a selected time period.

* * * * *